United States Patent
Wenham et al.

(10) Patent No.: US 8,619,750 B2
(45) Date of Patent: Dec. 31, 2013

(54) CO-EXISTENCE FOR CO-LOCATED RADIOS WHICH OPERATE IN THE SAME FREQUENCY BAND

(75) Inventors: Steven Wenham, Cambridgeshire (GB); Peter Wood, Cambridgeshire (GB)

(73) Assignee: Cambridge Silicon Radio Ltd., Cambridge (GB)

( * ) Notice: Subject to any disclaimer, the term of this patent is extended or adjusted under 35 U.S.C. 154(b) by 544 days.

(21) Appl. No.: 12/935,734

(22) PCT Filed: Apr. 9, 2009

(86) PCT No.: PCT/GB2009/050351
§ 371 (c)(1),
(2), (4) Date: Sep. 30, 2010

(87) PCT Pub. No.: WO2009/127859
PCT Pub. Date: Oct. 22, 2009

(65) Prior Publication Data
US 2011/0026512 A1   Feb. 3, 2011

(30) Foreign Application Priority Data

Apr. 15, 2008  (GB) .................................... 0806792.8
Jun. 10, 2008  (GB) .................................... 0810566.0

(51) Int. Cl.
*H04J 3/00* (2006.01)
(52) U.S. Cl.
USPC ........................................................ 370/345
(58) Field of Classification Search
USPC ......... 370/429, 449, 445, 458, 468, 338, 331, 370/318, 390, 335, 444, 345; 455/556.2, 455/63.1, 41.2
See application file for complete search history.

(56) References Cited

U.S. PATENT DOCUMENTS 7,454,171 B2 * 11/2008 Palin et al. ................... 455/41.2
8,073,388 B2 * 12/2011 Grushkevich et al. ....... 455/41.2
2007/0223430 A1   9/2007 Desai et al.

FOREIGN PATENT DOCUMENTS

WO    2006/090242 A1    8/2006

OTHER PUBLICATIONS

Anthony Murray, "Developments in Bluetooth Technology Driving New In-Vehicle Applications", EDN, 4 pages.
Simon Finch, "Bluetooth/Wi-Fi Co-existence: Attention to Detail Ensures QoS", RF Designline, Jan. 9, 2007, 4 pages.
Burch Seymour, "Brighten Up Your Bluetooth Designs with High-Quality Audio", Electronic Design, Oct. 4, 2004, 4 pages.
Bluetooth SIG, "Specification of the Bluetooth System: Master Table of Contents & Compliance Requirements", Covered Core Package version: 2.1 + EDR, Jul. 26, 2007, 11 pages.
Arto Palin et al., "VoIP call over WLAN with Bluetooth headset—multiradio interoperability solution", 2005, pp. 1560-1564.

\* cited by examiner

*Primary Examiner* — Chi Pham
*Assistant Examiner* — Alexander O Boakye
(74) *Attorney, Agent, or Firm* — Frommer Lawrence & Haug LLP; John W. Branch

(57) ABSTRACT

A co-existence method is described. The method comprises setting a priority level of a slot based on the likelihood that the slot will be required by a first radio and signaling the priority level to radio which is co-located with the first radio and which shares a resource with the first radio. The slot may, for example, be a re-transmission slot following a primary transmission slot or may be a sniff anchor point. The likelihood may be determined based on one or more factors, such as historical data or knowledge of the activity of a peer of the first radio.

16 Claims, 13 Drawing Sheets

CO-EXISTENCE FOR CO-LOCATED RADIOS WHICH OPERATE IN THE SAME FREQUENCY BAND

BACKGROUND

With the increasing use of WiFi (i.e. IEEE 802.11) and Bluetooth™, many devices are being developed which include both WiFi and Bluetooth capability. Examples include wireless VoIP (voice over internet protocol) telephones and smart phones. Although the WiFi and Bluetooth radio systems are independent and use the spectrum differently, they both operate in the 2.4 GHz frequency band and therefore traffic in one system can cause interference for the other system. In some devices, where the isolation between the antenna ports for the two systems is low, simultaneous operation of the two systems is not possible because transmitting in one system results in front-end overload interference on the other system.

Co-existence schemes have been developed which use out of band inter-radio signalling to reduce the interference. One example of a co-existence scheme uses TDM (time division multiplexing) to share bandwidth between the two systems. In such a scheme, one of the radios (either WiFi or Bluetooth) signals to the other radio that they have an important packet to transmit and/or receive and as a result the other radio does not transmit during a particular time slot. This mitigates the effects of interference between the two co-located radios by ensuring that only one system is active at any one time.

The embodiments described below are not limited to implementations which solve any or all of the disadvantages of known co-existence schemes.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A co-existence method is described. The method comprises setting a priority level of a slot based on the likelihood that the slot will be required by a first radio and signalling the priority level to radio which is co-located with the first radio and which shares a resource with the first radio. The slot may, for example, be a re-transmission slot following a primary transmission slot or may be a sniff anchor point. The likelihood may be determined based on one or more factors, such as historical data or knowledge of the activity of a peer of the first radio.

A first example co-existence method is described. Communication between a first radio and a remote radio uses a primary transmission slot to transmit a packet. If this transmission fails, a re-transmission slot may be used to re-transmit the packet. The method comprises setting a priority level of the re-transmission slot based on the likelihood that the re-transmission slot will be required and signalling the priority level to radio which is co-located with the first radio and which shares a resource with the first radio.

A second example co-existence method is described. When a peer of the first radio enters sniff subrating mode, the method comprises setting a priority level of a sniff anchor point based on the likelihood that the peer will be active at the sniff anchor point and signalling the priority level to a radio which is co-located with the first radio and which shares a resource with the first radio.

A first aspect provides a method comprising: setting a priority level of a slot based on a determination of a likelihood that the slot will be required by a first radio; and signalling the priority level to a second radio, wherein the first and second radios are co-located and share a resource.

The resource may comprise at least one of a frequency band and an antenna.

The first radio may comprise a Bluetooth radio and the second radio may comprise one of a Bluetooth radio, a WiFi radio, a WiMAX radio and a UWB radio.

Setting a priority level of a re-transmission slot based on a determination of a likelihood that the slot will be required by a first radio may comprise: determining a likelihood that the slot will be required by the first radio; and setting a priority level based on the likelihood.

Determining a likelihood that the slot will be required by the first radio may comprise: receiving data from the first radio; and determining a likelihood that the slot will be used by at least one of the first radio and a peer of the first radio.

The likelihood may be determined based on historical data.

The slot may comprise a re-transmission slot.

The slot comprises a re-transmission slot and determining a likelihood that the slot will be required by the first radio may comprise: computing a metric, the metric comprising one of a number of re-transmission slots used in a defined period and a number of failures in a primary transmission slot.

Setting a priority level based on the likelihood may comprise: comparing the metric to a threshold value; and setting the priority level based on a result of the comparison.

The likelihood may be determined based on an output from a classifier associated with the first radio.

Setting the priority level may comprise: if the output from the classifier indicates that a channel used for a primary transmission slot is poor, setting a high priority level; and if the output from the classifier indicates that a channel used for a primary transmission slot is good, setting a low priority level.

The slot may comprise a sniff anchor point.

The slot may comprise a sniff anchor point and determining a likelihood that the slot will be required by the first radio may comprise: determining a likelihood that a peer of the first radio will be active at the sniff anchor point.

The determination of a likelihood that a peer of the first radio will be active at the sniff anchor point may be based on at least a sniff subrate used by the peer.

The determination of a likelihood that a peer of the first radio will be active at the sniff anchor point may be based on at least analysis of traffic between the first radio and the peer at one or more previous sniff anchor points.

The priority level may be set based on both a determination of a likelihood that the slot will be required by a first radio and a traffic type associated with the slot.

A second aspect provides a computer program arranged to perform a method according to any of the preceding claims. The computer program may be stored on a tangible machine readable medium.

Third aspect provides an apparatus comprising a radio, the radio comprising: a prediction module arranged to set a priority level of a slot based on a determination of a likelihood that the slot will be required by the radio; and an output to a signalling link arranged to signal the priority level to a co-located radio, wherein the radio and the co-located radio share a resource.

The slot may comprise a re-transmission slot.

The radio may further comprise a classifier and the prediction module may be arranged to use an output from the classifier to determine the likelihood that the re-transmission slot will be required by the radio.

The slot may comprise a sniff anchor point.

The apparatus may further comprise the co-located radio and the signalling link between the radio and the co-located radio.

A further aspect provides a method substantially as described with reference to any of FIGS. 2-6 and 8-10 of the drawings.

A yet further aspect provides an apparatus substantially as described with reference to FIG. 1 or 13 of the drawings.

Another aspect of the invention provides one or more tangible device-readable media with device-executable instructions for performing a method described herein.

The methods described herein may be performed by firmware or software in machine readable form on a storage medium. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 11 shows a graphical representation of an implementation of the method shown in

FIG. 10;

Figure 1:
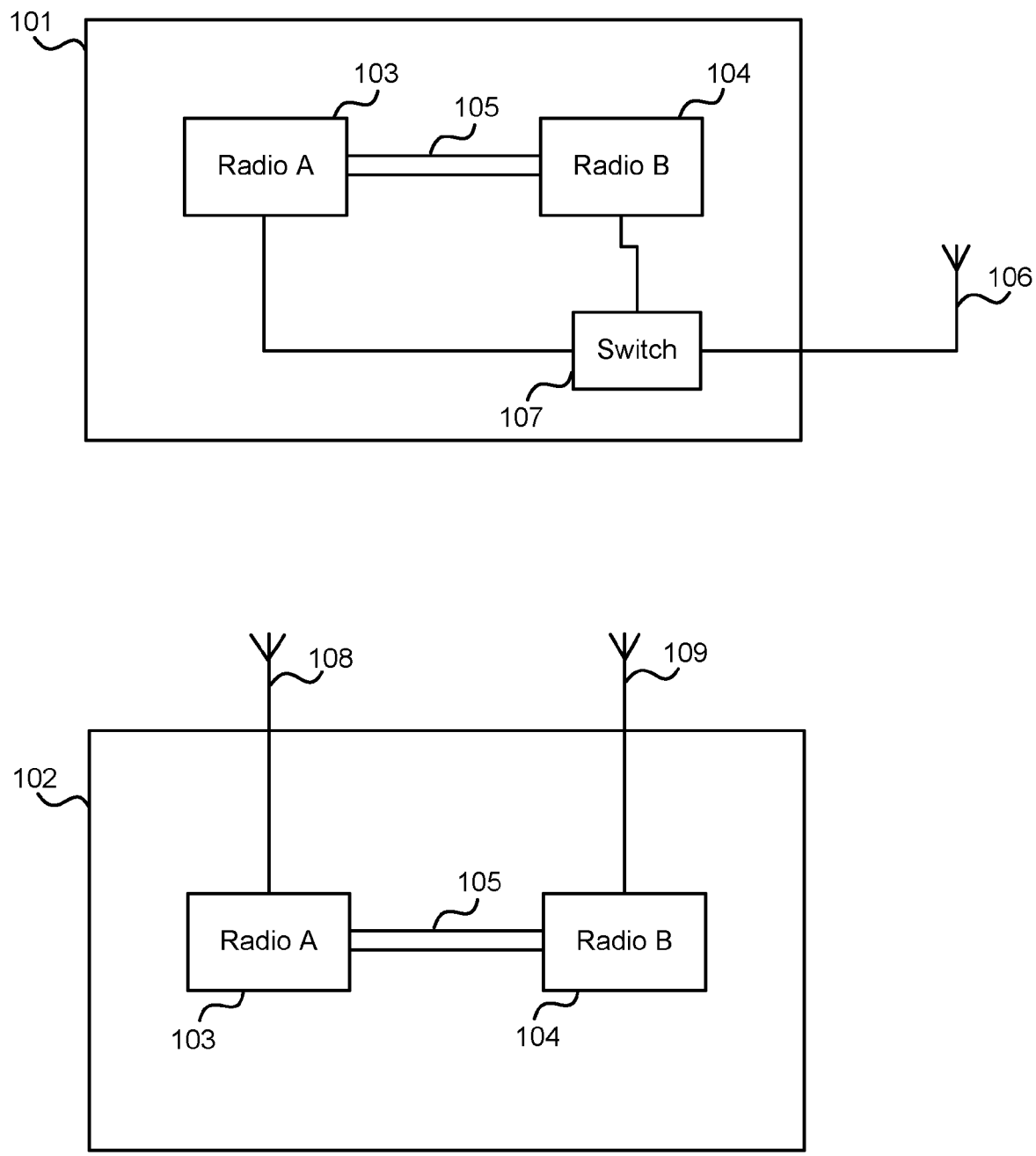
FIG. 1 is a schematic diagram of two example devices which each comprise two radios.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, co-located radios which operate in the same frequency band can cause interference and as a result co-existence schemes may be used to mitigate this interference. Current co-existence schemes, however, assign a fixed priority to operations of a particular type and this can lead to poor performance, inefficient use of bandwidth and/or poor data throughput.

FIG. 1 shows two schematic diagrams of devices 101, 102 which each comprise two radios 103, 104, and which are connected by a signalling link 105, such as short range bus. In the first device 101, the two radios share a single antenna 106 and a switch 107 is used to switch the antenna between the two radios. In such a device, the switch 107 may be operated by one of the two radios or by a separate entity (e.g. a dedicated Packet Traffic Arbitration (PTA) system). In the second device 102, each radio 103, 104 has a dedicated antenna 108, 109. In both example devices, the two radios 103, 104 use TDM to share a resource, where the resource may be bandwidth (e.g. where both radios operate in the same frequency band) and/or may be physical hardware (such as antenna 106). The signalling link 105 is used for the signalling to enable TDM. In an example, the isolation between the two radios (e.g. due to the proximity of antennas 108, 109 or the reverse isolation provided by the switch 107) may be less than 20 dB.

In an example, the first radio 103 may be a Bluetooth radio and the second radio 104 may be a WiFi radio. In other examples, however, the second radio 104 may use a different radio protocol (e.g. WiMAX (IEEE 802.16) or UWB (Ultra Wide Band)) or may be a second Bluetooth radio. In further examples the first radio 103 may use a different radio protocol. Whilst all these examples relate to radio protocols which operate in the 2.4 GHz band, the methods are also applicable to radio protocols which use other frequency bands.

The methods described herein are principally directed to use in devices comprising two or more co-located radios which operate within the same frequency band, the two (or more) co-located radios may alternatively operate in different frequency bands but share a resource.

In an example, the device 101, 102 may be a mobile telephone or other handheld device where one radio is used for data communications (e.g. to and from the internet) and the other radio is used to carry voice traffic to and from a remote device such as a headset. The voice traffic is typically carried in synchronous streams of packets, whilst the data traffic occurs in bursts (i.e. one or more packets followed by a gap before another group of packets).

Figure 2:
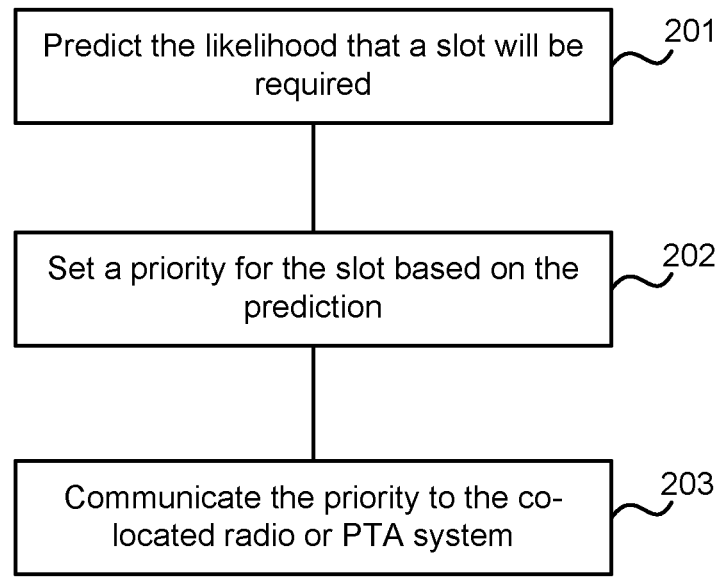
FIGS. 2-6 are flow diagrams of example co-existence methods.

FIG. 2 is a flow diagram of an example co-existence method which may be performed by either of the radios in a device (e.g. radio 103 or radio 104) or by another element (e.g. by a PTA system). For the purposes of the following description, the co-existence method is described as being performed by the 'first' radio in a device (e.g. radio 103). It will be appreciated that this is by way of example only.

The likelihood that a particular slot will be required (or used) is predicted (block 201) and a priority level associated with the slot is determined based on this predicted likelihood that it will be used (block 202). The priority level which has been determined is then communicated to the co-located radio (block 203) over the signalling link 105. Alternatively, the priority level may be communicated (in block 203) to another entity, such as a PTA system (which may be implemented on one of the radio chips) or scheduling device.

The term 'slot' is used herein to refer to any time synchronised transmission or reception opportunity. Whilst some radio protocols have an explicit meaning of a slot (e.g. the Bluetooth protocol), others may not (e.g. ULP Bluetooth, formerly known as Wibree) and the term 'slot' is not intended to refer to any specific protocol but to relate to any time synchronised transmission/reception opportunity.

The likelihood that is determined (in block 201) may be in terms of a probability, a count or in any other form. The mapping between the likelihood and a priority level (in block 202) may be based on an algorithm, a look-up table, one or more thresholds (as in FIGS. 5, 6 and 9), etc.

Figure 3:
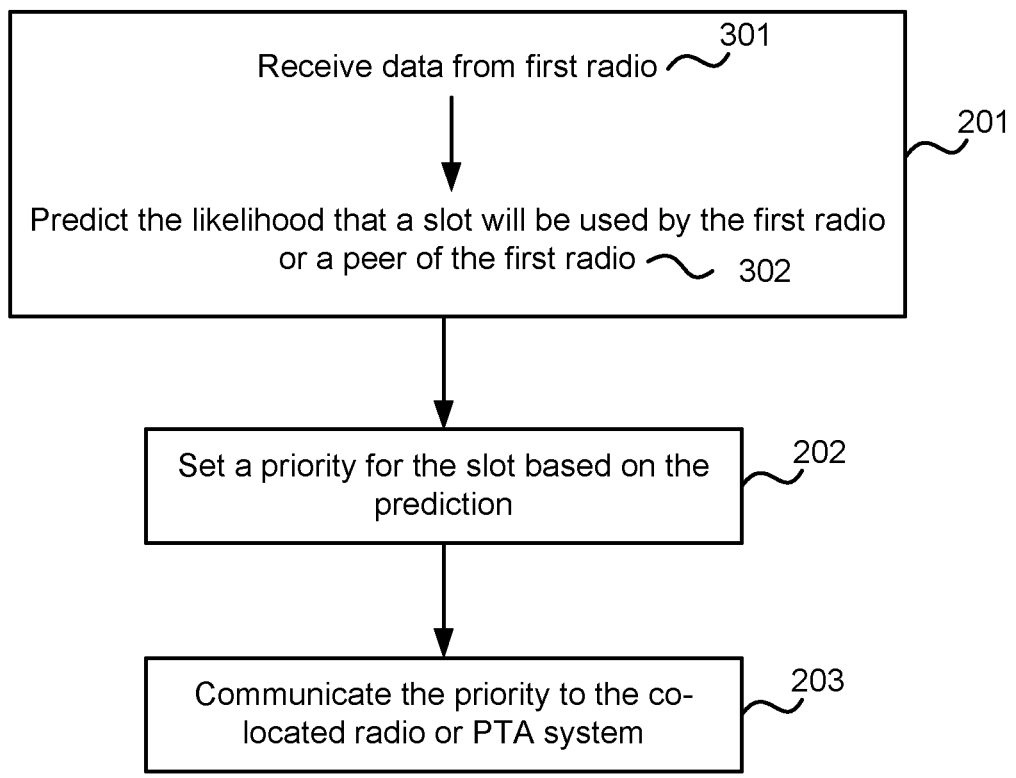

In another example, the prediction may be performed by the second radio (e.g. a WiFi radio) in relation to slots used by the first radio. In such an example, the method may be modified as shown in FIG. 3. In this example, the prediction step (block 201) is performed at the second radio. The second radio receives data from the first radio (block 301) and uses this data to predict the likelihood that a slot will be used by the first radio or a peer of the first radio (block 302). A priority is then set for the slot based on the prediction (block 202) and this priority may be subsequently communicated to the co-located radio (i.e. the first radio), PTA system or other entity (block 203). In some examples, the communication of priority may not occur and this may be dependent on which entity performs the arbitration over the shared resource between the first and the second radios. For example, where the arbitration is performed by the second radio, which determines whether it can transmit in a slot based on the priority associated with the first radio, no such step is required.

Enabling the priority level of slots to be adapted to the predicted likelihood that the slot will be used, (e.g. using the method shown in FIG. 2 or 3), results in efficient use of the shared resource, such as the bandwidth. This may be particularly beneficial in certain situations, such as good radio conditions or when one or more of the radios enter a low power mode (e.g. as described in more detail below).

The methods described herein may be used by a radio that is receiving or transmitting data in the slot and by a radio which is acting as a slave or a master. The techniques described above may be used in any type of network including piconets and scatternets (where a slave has more than one master e.g. a headset used with an MP3 player and a mobile telephone).

The term 'peer' in relation to a first radio is used herein to refer to a second radio with which the first radio is communicating. The second radio may be remote from the first radio and the second radio will not be co-located, i.e. they will not be within the same device and/or will not be connected via a signalling link (e.g. signalling link 105). In the example of FIG. 1, if radio A 103 in device 101 communicates with radio A 103 in device 102, these two radios are considered peers.

There are many different factors which may be considered in determining the likelihood that a slot may be required (in block 201) and the likelihood may be defined in terms of a probability, a value (e.g. a count) or in any other form. Examples of factors which may be used include:

- history, i.e. on the past performance of the communications link between the first radio in the device and a peer (e.g. a remote radio in the same radio system);
- the output of a classifier;
- the sniff subrate being used by a peer;
- whether the radio is acting as a slave or a master;
- the mode of operation of the radio and/or the peer radio;
- network topology;
- traffic statistics or other outputs from traffic analysis;
- traffic type;
- slot type, e.g. re-transmission slot or sniff anchor point; and
- information received from higher layers.

The methods described herein may be applied to a particular type of traffic, e.g. for voice data, and not to other types of traffic (e.g. bulk data) or vice versa. Alternatively the methods described above may be applied to more than one type of traffic (e.g. voice and data) or to all types of traffic. In some examples, different prediction methods may be used dependent upon the traffic type.

The following description provides two specific examples which relate to two different types of slots: re-transmission slots and sniff anchor points. It will be appreciated that the methods described herein are also applicable to other types of slots and these two specific examples are provided by way of example only.

A technique which is included within the Bluetooth specification is eSCO (extended Synchronous Connection Orientated), which is designed to improve audio quality in the presence of third party interferers. eSCO provides a re-transmission window during which packets which have not been received, or which have been received in a corrupted form, can be re-transmitted. These re-transmissions improve the reliability of data transmission and as a result, if the data is audio data, the perceived audio quality is improved.

Figure 4:
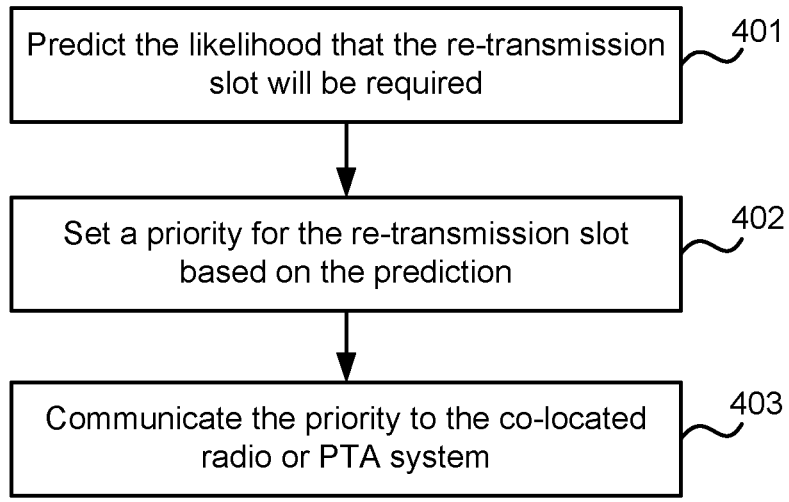

FIG. 4 is a flow diagram of an example co-existence method. This method may be performed by a radio which uses a protocol which includes re-transmissions. In such a protocol, a packet is initially transmitted in a primary transmission slot. If this packet is not acknowledged by the receiving device or if the acknowledgement identified that the packet received contained errors, the packet may be re-transmitted in a re-transmission slot. There may be one or more re-transmission slots following a primary transmission slot. Bluetooth eSCO is just one example of such a protocol. The radio may be, for example, one of the radios 103, 104 shown in FIG. 1.

The likelihood that a re-transmission slot will be required (or used) is predicted (block 401) and a priority level associated with the re-transmission slot is determined based on this predicted likelihood that it will be used (block 402). The priority level which has been determined is then communicated to the co-located radio (block 403) over the signalling link 105. Alternatively, the priority level may be communicated (in block 403) to another entity, such as a PTA system (which may be implemented on one of the radio chips) or scheduling device.

For the purposes of the following description, the co-existence method is described as being performed by the 'first' radio in a device (e.g. radio 103). It will be appreciated that this is by way of example only and the method may alternatively be performed by the other radio in the device (e.g. radio 104) or by another element (e.g. by a PTA system).

In an example, the device 101, 102 may be a mobile telephone or other handheld device where one radio is used for data communications (e.g. to and from the internet) and the other radio is used to carry voice traffic to and from a remote device such as a headset. The voice traffic is typically carried in synchronous streams of packets, whilst the data traffic occurs in bursts (i.e. one or more packets followed by a gap before another group of packets). In most applications, the voice traffic is considered to be of greater importance than the data or internet traffic, in order that the user experiences good audio quality with the minimum of clicks or other interruptions. As a result a typical co-existence scheme assigns re-transmission slots for voice traffic a high priority. This fixed priority assignment is inefficient in some scenarios e.g. where the radio conditions are good and therefore the transmission of the packet in the primary transmission slot is successful on most occasions.

By enabling the priority level of the re-transmission slots to be adapted to the predicted likelihood that the slot will be used the method shown in FIG. 4 enables efficient use of the shared resource, such as the bandwidth. Where there is little interference (also referred to as 'clean' air conditions) and the probability that the primary transmission will be successful is therefore high, the slots that would otherwise (in the fixed assignment scheme) be reserved by the first radio for re-transmissions can instead be used by the other radio if required. If however, there is more interference ('dirty' air conditions) which increases the probability that the packet transmitted in the primary transmission slot will not be received correctly or will not be received at all, the re-transmission slots can be kept available for the first radio.

This method may be used by a radio that is receiving or transmitting data in the primary transmission slot and potentially also in the re-transmission slots. Where the radio is receiving, the radio requires access to the shared resource in the re-transmission slots in order to listen for a re-transmitted packet.

Figure 5:
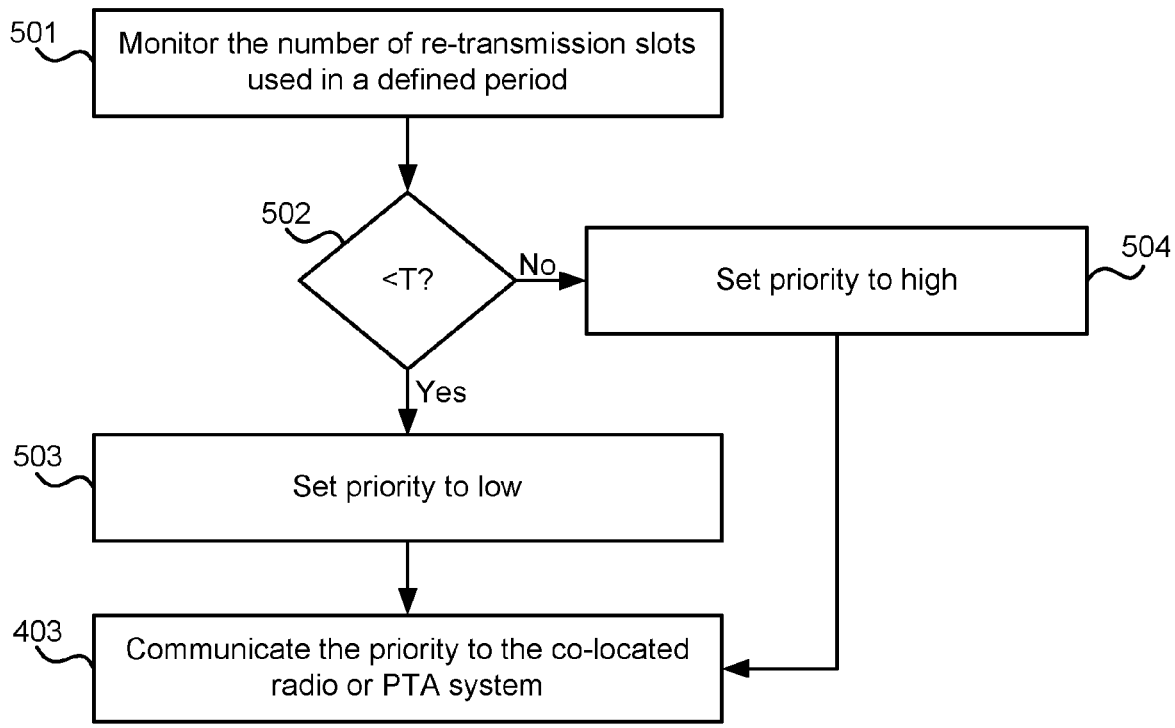

There are many different factors which may be considered in determining the likelihood that the re-transmission slots may be required (in block 401) and the likelihood may be defined in terms of a probability, a value (e.g. a count) or in any other form. In a first example, this prediction may be based on history, i.e. on the past performance of the communications link between the first radio in the device and a remote radio (in the same radio system). The remote radio may be, for example, a handheld device, an access point, a computer etc. FIG. 5 shows a co-existence method, which is a variation of that shown in FIG. 4, in which the number of re-transmission slots which are used in a defined period are monitored (block 501). If this number falls below a defined threshold ('Yes' in block 502), the priority of the re-transmission slots is set to low (block 503), whilst if the number exceeds the threshold ('No' in block 502), the priority of the re-transmission slots is set to high (block 504). The priority level set is then communicated to the co-located radio (block 403). The defined period over which the number of re-transmission slots used is determined may be configurable and/or the defined threshold may be configurable. Whilst the defined period may comprise a single primary transmission slot, in other examples the defined period may comprise multiple transmission slots. Use of multiple primary transmission slots (e.g. multiple eSCO windows) to predict the requirement for re-transmission slots may be more reliable and stable, and avoids an immediate reaction to a single lost packet which may be an isolated incident.

Figure 6:
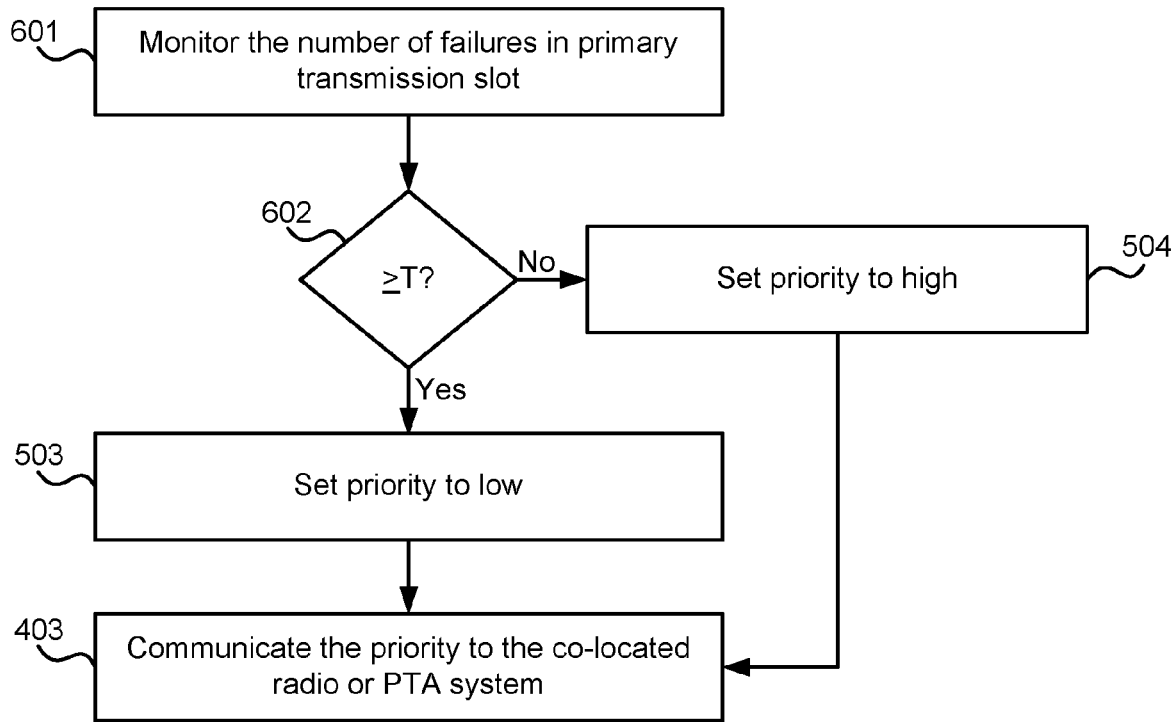

In another example, instead of monitoring the number of re-transmission slots used (as shown in block 501), the number of transmission failures in the primary transmission slot may be monitored over the defined period, as shown in FIG. 6 (block 601). In other examples the number of successful transmissions in the primary transmission slot or other historical factors may be used as a metric.

In a further example, the prediction (in block 401) may be based on the output of a classifier in the first radio. A classifier is a function or component within a frequency-agile radio (i.e. a radio which can operate on more than one frequency) which determines which frequencies are clear of radio traffic and are therefore suitable for use and which frequencies are to be avoided. The determination of frequencies to be avoided may be based on one or more factors, such as history (i.e. past error rates on particular frequencies) and results of a scan to detect third party interferers. Where the prediction (in block 401) uses the output of a classifier, the analysis may be performed on a slot by slot basis, as described in more detail below.

Where a radio protocol is used which includes frequency hopping or other technique which involves transmitting on different frequencies, the classifier is typically used to select one or more channels (or frequencies) for use, avoiding channels with poor radio conditions (e.g. due to interference). However, in certain situations, a radio may be required to use a channel which the classifier has identified as poor and an example of such a situation can be described with reference to FIG. 7.

Figure 7:
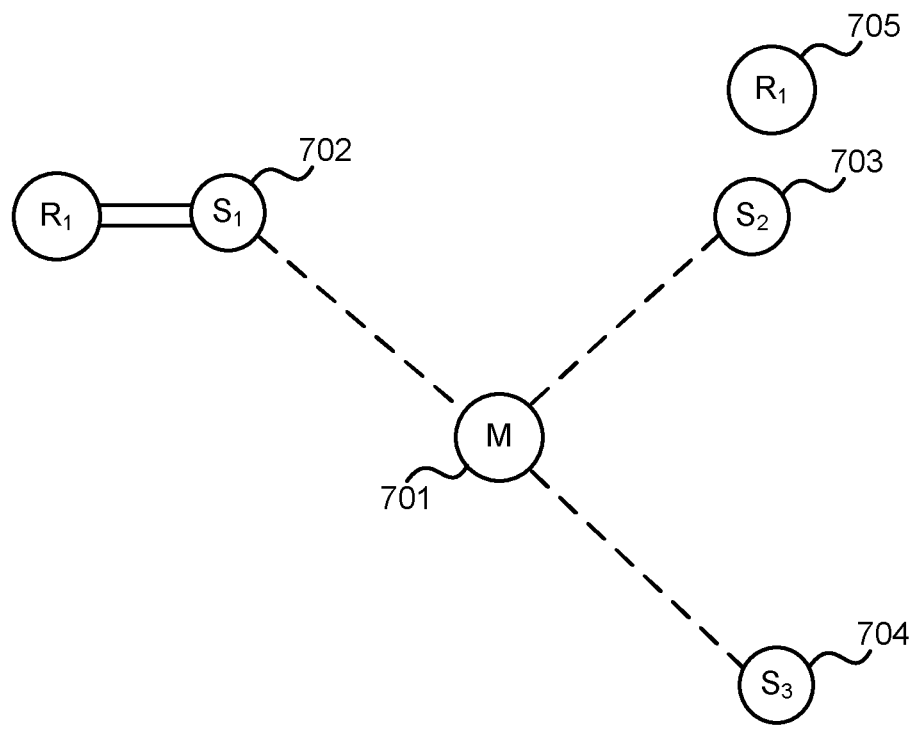
FIG. 7 shows a schematic diagram of a network of radios.

FIG. 7 shows a schematic diagram of a network of radios 701-704 using the same protocol (e.g. a Bluetooth piconet). The network may comprise a master 701 and a number of slaves 702-704 and due to the physical separation of the radios, different radios may experience different radio conditions. For example, one of the radios, $s_2$, 703 may have a nearby third party interferer 705 which may result in interference at that radio but not cause interference to the other radios. Another of the radios, $s_1$, 702 may have a co-located radio 706 which may cause local interference to radios, $s_1$, 702 and hence may requires use of a co-existence method as described herein. If the network uses adaptive frequency hopping, each slave reports the poor (and/or the good) channels (as determined by the classifier in each slave) to the master and the master selects the channels for use by all the radios in the network based on this information. The different radio conditions experienced by different slaves result in different slaves identifying different poor channels. Where there is more than one slave, situations may occur where there are not the required number of channels (e.g. 20 from a set of 79) which are indicated as good by all of the slaves and in this situation, the master will select one or more channels for use which may include a channel which one or more of the slaves has identified as a poor channel.

Figure 8:
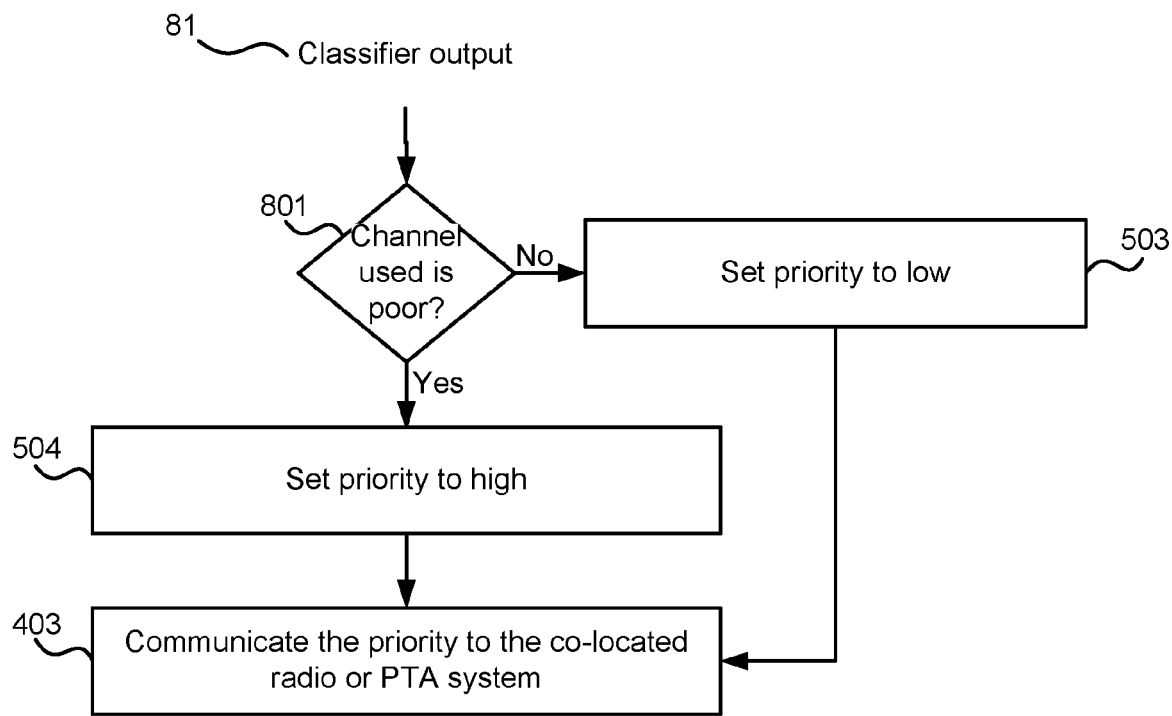
FIGS. 8-10 are flow diagrams of further example co-existence methods.

FIG. 8 is a flow diagram of another co-existence method. This method uses the output 81 of a classifier to predict whether the re-transmission slot is likely to be required. In this method, it is determined whether the frequency being used for the primary transmission slot is a poor channel (in block 801) and if it is ('Yes' in block 801), the priority of the re-transmission slot is set to high (block 504). If however, the output 81 of the classifier indicates that the frequency being used is a good channel ('No' in block 802), the priority of the re-transmission slot is set to low (block 503). As described above, the priority level, once determined, is communicated to the co-located radio (block 403).

Figure 9:
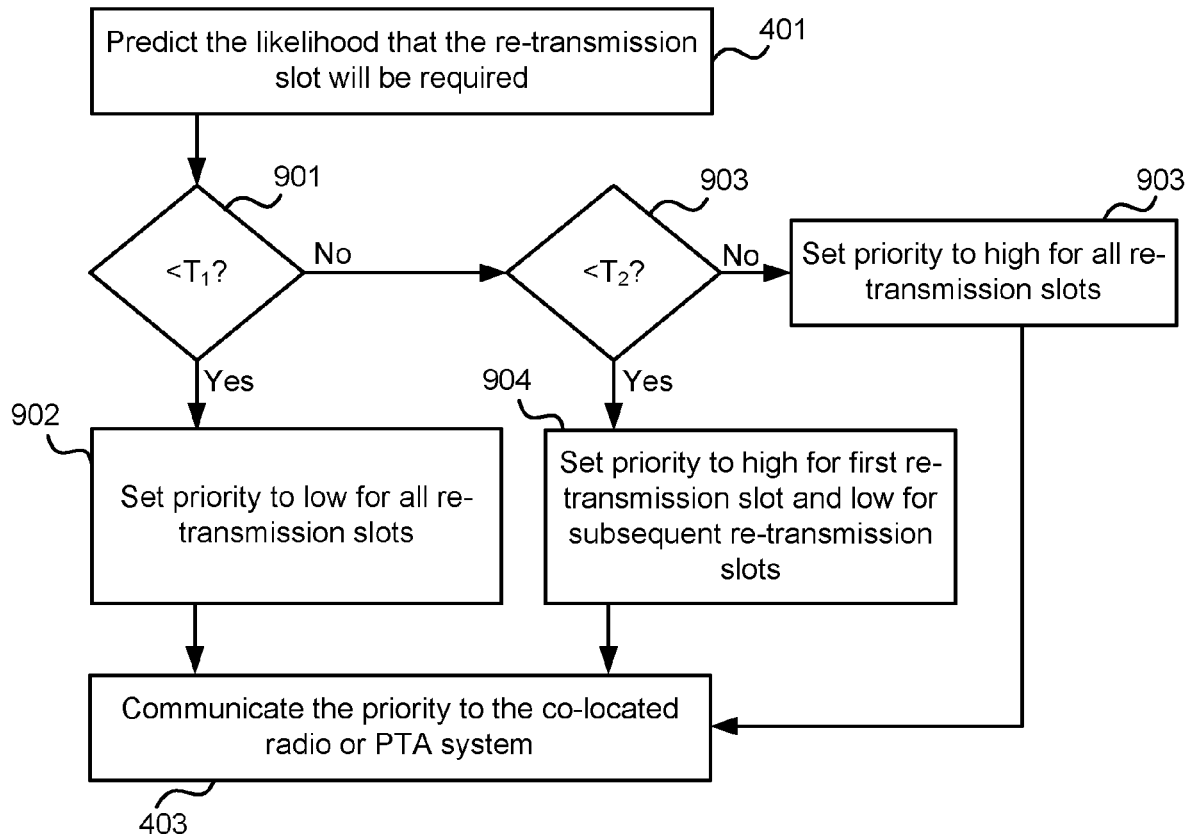

The methods described above refer to setting a priority level for a re-transmission slot; however in many examples there may be more than one re-transmission slot following a primary transmission slot. In an example, the same priority level may be set for all the re-transmission slots following a primary transmission slot. In another example, different priority levels may be set for different re-transmission slots. For example, where there are two re-transmission slots, two thresholds, $T_1$, $T_2$ may be defined in relation to the likelihood of a re-transmission slot being required, as shown in FIG. 9. These thresholds may be defined in terms of historical data (e.g. number of failures in transmission in the primary transmission slot in a defined period or number of re-transmission slots used in the defined period), in terms of classifier output (e.g. the level of interference on a particular frequency) or in terms of any other factor used in the prediction (in block 401).

In the example shown in FIG. 9, if the likelihood is less than the first threshold $T_1$ ('Yes' in block 901), the priority is set to low for all re-transmission slots (block 902). If however, the likelihood is more than the first threshold $T_1$ but less than the second threshold $T_2$ ('No' in block 901 and 'Yes' in block 903), the priority is set to high for the first re-transmission slot and to low for any subsequent re-transmission slots (block 904). Where the likelihood exceeds both thresholds ('No' in both blocks 901 and 903), the priority is set to high for all re-transmission slots (block 905).

In another example, the priority of the first re-transmission slot may be set based on the output of the classifier in relation to the channel used for the primary transmission slot. The priority of the second transmission slot may be set based on the output of the classifier in relation to the channel used for the first re-transmission slot, and so on.

The methods described above may be applied to a particular type of traffic, e.g. for voice data, and not to other types of traffic (e.g. bulk data). Alternatively the methods described above may be applied to more than one type of traffic (e.g. voice and data) or to all types of traffic. Whilst the methods are particularly beneficial for synchronous traffic (e.g. voice) or other traffic where latency cannot be tolerated, the methods are also applicable to asynchronous traffic (e.g. a slave transmitting data to a master).

Where the methods are used for more than one type of traffic, different thresholds or other criteria may be set to determine when the priority is set to high and when the priority is set to low for the re-transmission slots (i.e. different criteria may be used in block 402). In an example, the criteria required to set the priority for a re-transmission slot to high for data may be higher than the corresponding criteria for voice traffic. There may be some types of traffic, such as signalling activity to scan and connect to other devices and signalling activity to set up and maintain links, where the method may not be applied in some examples, and instead the priority for this traffic may be fixed (e.g. always be set to high).

The network shown in FIG. 7 comprises a master device 701 and a number of slave devices 702-704. The methods described above may be implemented at a slave device or at a master device (or in a device which is both a slave and a master). The methods may be implemented for unidirectional or bidirectional traffic, and the methods may be applied if the device will be transmitting and/or receiving in the re-transmission slots.

Whilst the methods described above show the priority level being communicated following each determination (or in relation to each eSCO window), it will be appreciated that in some examples, only a change in priority level will be communicated to the co-located radio (in block 403).

The methods described above may be implemented in relation to Bluetooth eSCO re-transmissions. This is just one example of an implementation and the methods may be used with other radio protocols.

Another technique which is included within the Bluetooth specification is sniff subrating (e.g. in Bluetooth 2.1+EDR (Enhanced Data Rate) and ULP (Ultra Low Power) Bluetooth). Sniff mode within Bluetooth is a mode for reduced power consumption in which the master and slaves are synchronised through keep-alive messages transmitted at regular intervals; these intervals are referred to as sniff anchor points. When in Sniff mode, a master polls the slaves at each sniff anchor point and the slave device listens at each sniff anchor point. Sniff subrating reduces the power consumption further by allowing a device to use a reduced number of sniff anchor points. When sniff subrating is used, devices transition between sniff mode and sniff subrating mode based on a timeout value and whether ACL (Asynchronous Connectionless) data is received from a remote device.

On entering sniff subrating mode, a negotiation occurs between the master and the slave to agree the sniff anchor points at which the master will transmit to the slave and the slave will listen for the master. In an example of this negotiation, as set out in the Bluetooth specification version 2.1+ EDR, each of the devices communicate a subrate to the other and where the maximum subrate received by the master, M, is not the same as the maximum subrate received by the slave, N, the sniff subrate anchor points at which the master transmits and the slave listens is given by:

If M>N, the master must transmit at least once every j anchor points where: $j=\lfloor M/N \rfloor$ If M<N, the slave must listen at least once every j anchor points where: $J=\lfloor N/M \rfloor$ In another example of this negotiation, as used in ULP Bluetooth (formerly known as Wibree), the master communicates a subrate to the slave but the master continues to transmit at each of the sniff anchor points.

Figure 10:
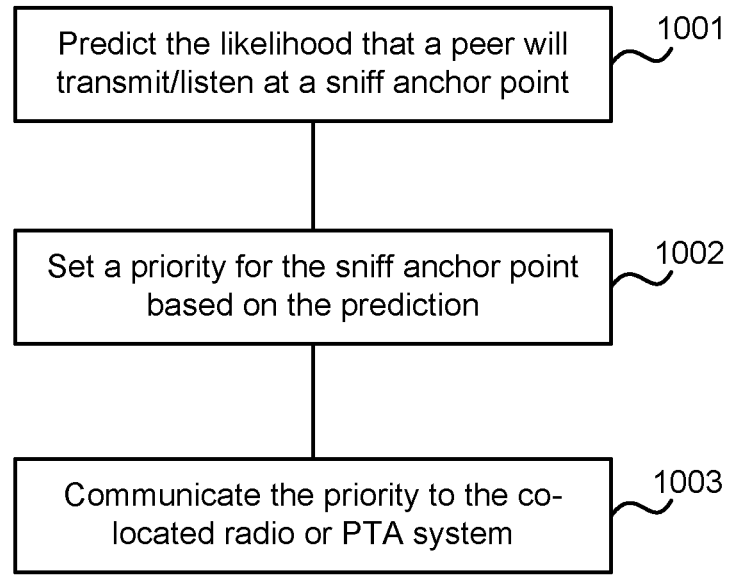

FIG. 10 is a flow diagram of another example co-existence method. This method may be performed by a radio which is in sniff subrating mode and/or by a radio which is communicating with a peer which is in sniff subrating mode. According to this method, the likelihood that a peer will transmit or listen at a particular sniff anchor point is predicted (block 1001). Based on this prediction, a priority level is set for the sniff anchor point (block 1002) and this priority level is communicated to the co-located radio or PTA system (block 1003). Alternatively, the priority level may be communicated (in block 1003) to another entity such as a scheduling device.

Figure 11:
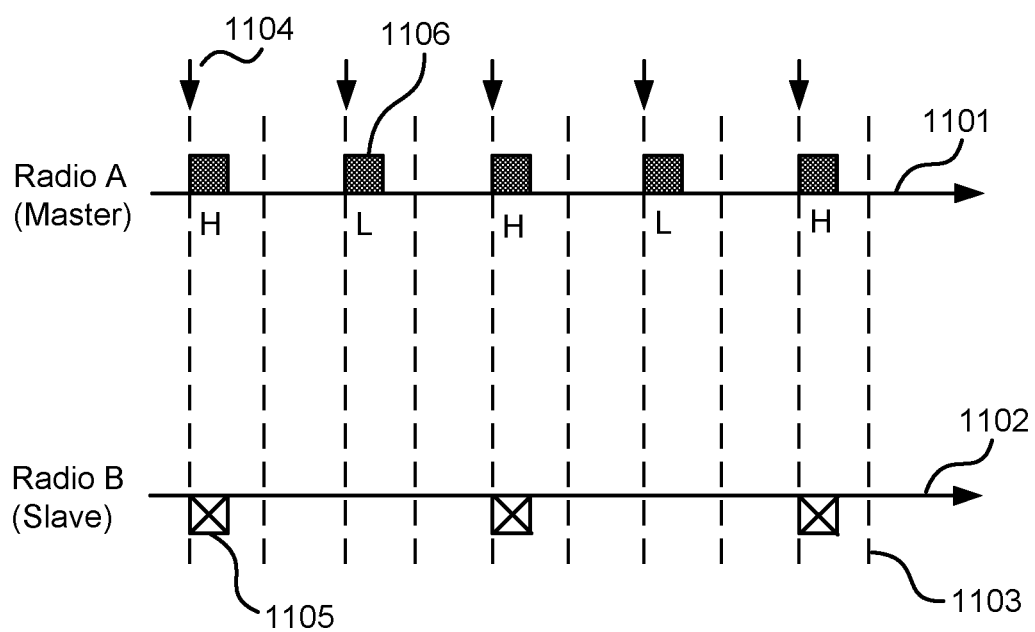

FIG. 11 shows a graphical representation of an implementation of the method shown in FIG. 10. The representation shows two timelines 1101, 1102, one for radio A, which is acting as a master, and one for radio B, which is acting as a slave. Dotted lines 1103 indicate time slots and sniff anchor points are identified by arrows 1104. In this example, radio B is in sniff subrating mode and only listens for the master (as indicated by block 1105) on alternate sniff anchor points (e.g. j=2 in the terminology used earlier). The master (radio A), however, transmits a keep-alive message (as indicated by block 1106) at every sniff anchor point in this example.

In this example, radio A uses its knowledge of the sniff subrate used by radio B to predict that on alternate sniff anchor points, radio B is unlikely to be listening (as in block 1001) and therefore sets the priority level for its transmission at these anchor points to low (as in block 1002). The priority levels set by radio A for each of the sniff anchor points are shown by 'H' for high priority and 'L' for low priority in FIG. 11.

Whilst the representation shown in FIG. 11 and corresponding description above relates to making the prediction (in block 1001) based on the sniff subrate used by a peer, there are a number of different factors which may be used in making the prediction and one or more of such factors may be used. Examples of factors which may be used include:

sniff subrate used by the radio and/or the peer (e.g. as shown in FIG. 11)

history traffic shaping data received from higher levels (e.g. from a host processor within the device which communicates with the radio)

Where traffic shaping is used, this may involve a controller within the radio (e.g. the Bluetooth controller, where the radio is a Bluetooth radio) monitoring the activity of the peer and generating statistics on the activity (e.g. how often the peer communicates at a sniff anchor point). In other examples, the monitoring may occur at a higher layer, and for example, where the traffic is relatively continuous and consistent (e.g.

where the traffic is mouse/keyboard data from a Bluetooth mouse/keyboard), all the sniff anchor points may be always set to high, whereas if the traffic is in periodic bursts, some (or all) of the sniff anchor points may be set to low during the periods between bursts of traffic.

Figure 12:
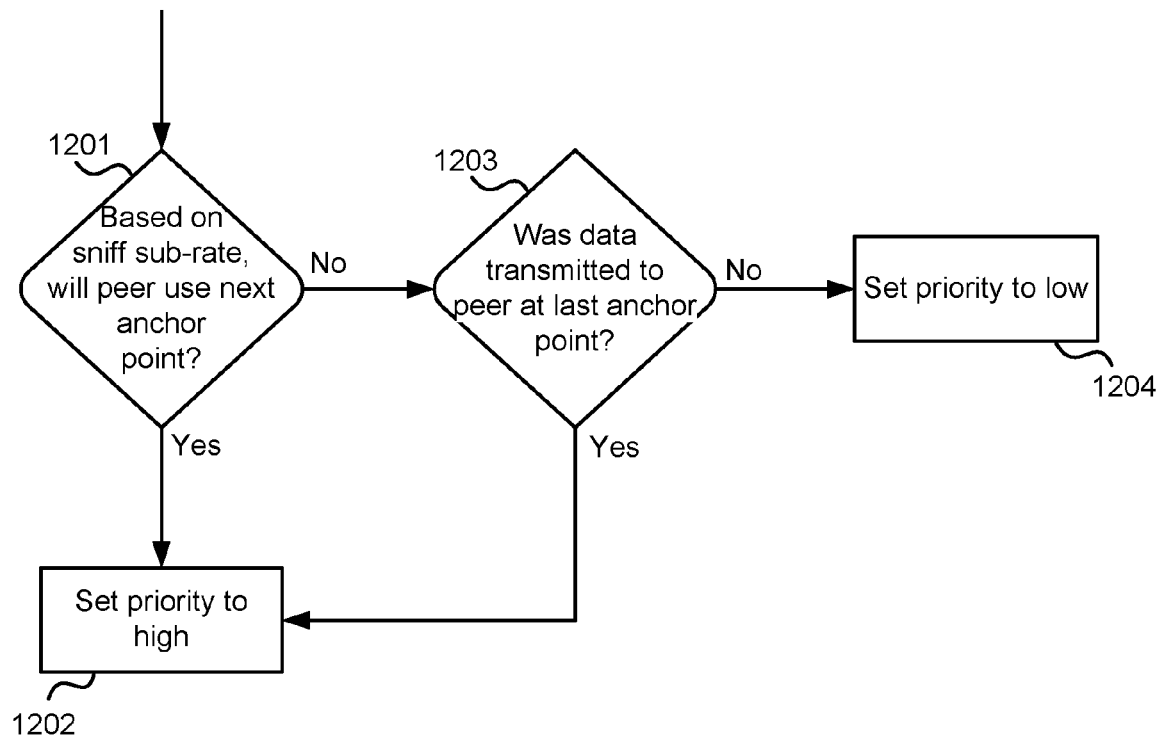
FIG. 12 shows a flow diagram of an example method of setting the priority of slots for transmission/reception at a sniff anchor point.

FIG. 12 shows a flow diagram of an example method of setting the priority of slots for transmission/reception at a sniff anchor point based on two factors: the sniff subrate and traffic patterns. In a first step it is determined, based on the sniff subrate used by the peer, whether the peer will be listening/transmitting at the anchor point (block 1201). If the peer is likely to be transmitting/listening the priority is set to high (block 1202). If however, based on the sniff subrate, the peer is unlikely to be listening/transmitting ('No' in block 1201), the second factor is considered (in block 1203). If the radio transmitted data to the peer at the previous anchor point ('Yes' in block 1203), then the priority is set to high (block 1202). This is because the peer may be ready to respond to the data. If however, no data was transmitted to the peer at the previous anchor point ('No' in block 1203), the priority is set to low (block 1204).

It will be appreciated that FIG. 12 shows just one example of how knowledge of traffic patterns may be used to predict the likelihood that data will be transmitted by a peer at a particular sniff anchor point. In other examples, the two factors may be considered in different orders (e.g. block 1203 occurs before block 1201), only one factor may be considered or other factors may be used to make the prediction.

The methods described above with reference to FIGS. 10-12 may be used in relation to setting the priority of sniff anchor points irrespective of whether the anchor point is used to transmit a keep-alive message, data or any other traffic.

The above description provides two specific examples which relate to two different types of slots: re-transmission slots (as in FIGS. 4-9) and sniff anchor points (as in FIGS. 10-12). The methods described herein are also applicable to other types of slots and these two specific examples are provided by way of example only. In a further example, the methods described herein may be applied to bulk data operations and in such an example the priority level may be set based on the output of a classifier, e.g. by setting the priority level to a first level (e.g. low) for bulk data transmissions on a channel which is identified as a poor channel and by setting a different priority level (e.g. high) for bulk data transmissions on a channel which is identified as being good channel.

Figure 13:
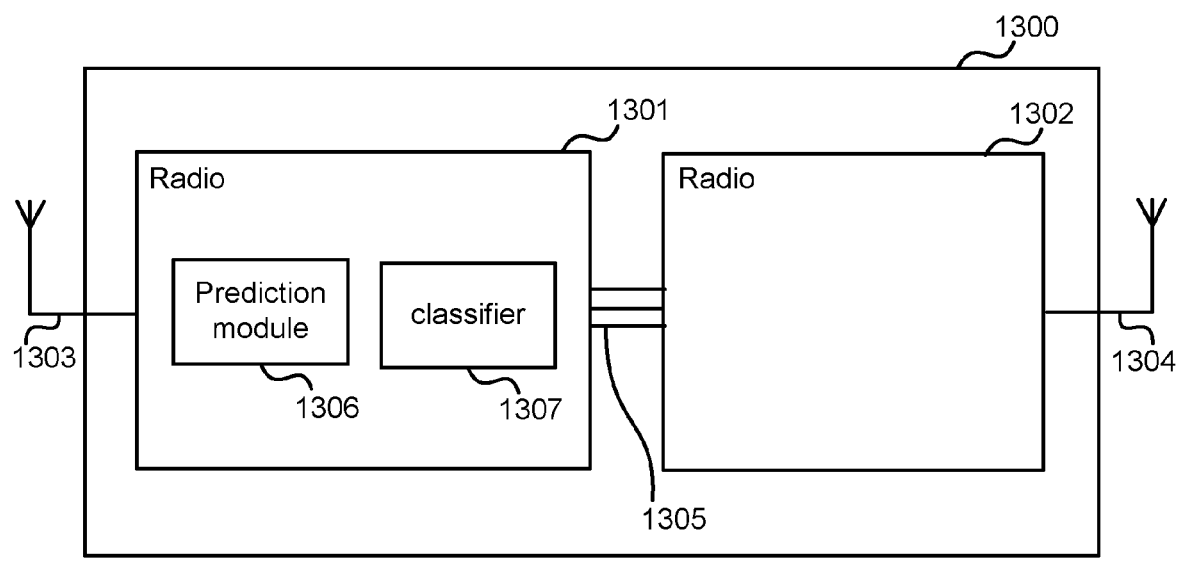
FIG. 13 is a schematic diagram of another example device which comprises two radios.

FIG. 13 illustrates various components of an exemplary device 1300 which may be implemented as any form of a computing and/or electronic device, and in which embodiments of the methods described herein may be implemented.

The device 1300 comprises two radios 1301, 1302 which share a resource. In this example the radios each have a separate antenna 1303, 1304 but share the same frequency band although they may use different radio protocols (e.g. Bluetooth and WiFi). The two radios can communicate over a signalling link 1305, which may comprise a short range bus.

The first radio 1301, which implements the methods described herein, comprises a prediction module 1306. This prediction module 1306 may use any factors to make the prediction, e.g. historical data (e.g. number of failures in primary transmission slots) or the output from a classifier 1307. The prediction module 1306 may be implemented in hardware, software, firmware or in any other manner. In an example, the prediction module 1306 may be implemented in an integrated circuit (IC).

The first radio 1301 may also comprise one or more processors which may be microprocessors, controllers or any other suitable type of processors for processing computing executable instructions to control the operation of the device in order to set priority of slots as described above. The prediction module may, for example, be implemented in software. The computer executable instructions may be provided using any computer-readable media, such as memory. The memory is of any suitable type such as random access memory (RAM), flash memory, EPROM or EEPROM.

Although the methods described above refer to the setting of the priority at one of two levels, high or low, it will be appreciated that the methods are also applicable where there are more than two priority levels. In such an example, the level selected (from a set of possible levels) may be dependent upon the predicted likelihood that the slot will be used, upon the nature of the traffic being carried or upon other factors— different priorities may be assigned to different traffic types such as voice, data, link control, etc.

The above description provides a number of different examples of data which may be used to determine the priority level that should be set for any slot, be it a transmission slot or a reception slot. In addition to the data sources described above, other data sources may also be used to assist in the determination of the priority level that is set. For example, the quality of service parameters for the link may also be used.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise and exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
   setting a priority level of a slot based on a determination of a likelihood that the slot will be required by a first radio; and
   signaling the priority level to a second radio, wherein the first and second radios are co-located and share a resource;
   wherein setting a priority level of slot based on a determination of a likelihood that the slot will be required by a first radio comprises:
   determining a likelihood that the slot will be required by the first radio; and
   setting a priority level based on the likelihood;
   wherein the slot comprises a re-transmission slot and wherein determining a likelihood that the slot will be required by the first radio comprises:
   computing a metric, the metric comprising one of a number of re-transmission slots used in a defined period and a number of failures in a primary transmission slot.

2. The method according to claim 1, wherein the resource comprises at least one of a frequency band and an antenna.

3. The method according to claim 1, wherein the first radio comprises a Bluetooth radio and the second radio comprises one of a Bluetooth radio, a WiFi radio, a WiMAX radio and a UWB radio.

4. The method according to claim 1, wherein the likelihood is determined based on historical data.

5. The method according to claim 1, wherein the slot comprises a re-transmission slot.

6. The method according to claim 1, wherein determining a likelihood that the slot will be required by the first radio comprises:
   receiving data from the first radio; and
   determining a likelihood that the slot will be used by at least one of the first radio and a peer of the first radio.

7. The method according to claim 1, wherein setting a priority level based on the likelihood comprises:
   comparing the metric to a threshold value; and
   setting the priority level based on a result of the comparison.

8. A method comprising:
   setting a priority level of a slot based on a determination of a likelihood that the slot will be required by a first radio; and
   signaling the priority level to a second radio, wherein the first and second radios are co-located and share a resource;
   wherein setting a priority level of slot based on a determination of a likelihood that the slot will be required by a first radio comprises:
   determining a likelihood that the slot will be required by the first radio; and
   setting a priority level based on the likelihood:
   wherein the slot comprises a sniff anchor point and wherein determining a likelihood that the slot will be required by the first radio comprises:
   determining a likelihood that a peer of the first radio will be active at the sniff anchor point;
   wherein the determination of a likelihood that a peer of the first radio will be active at the sniff anchor point is based on at least a sniff subrate used by the peer.

9. The method according to claim 8, wherein the determination of a likelihood that a peer of the first radio will be active at the sniff anchor point is based on at least analysis of traffic between the first radio and the peer at one or more previous sniff anchor points.

10. The method according to claim 8, wherein the slot comprises a sniff anchor point.

11. The method according to claim 8, wherein the priority level is set based on both a determination of a likelihood that the slot will be required by a first radio and a traffic type associated with the slot.

12. An apparatus comprising a radio, the radio comprising:
    a prediction module arranged to set a priority level of a slot based on a determination of a likelihood that the slot will be required by the radio; and
    an output to a signaling link arranged to signal the priority level to a co-located radio, wherein the radio and the co-located radio share a resource;
    wherein the slot comprises a re-transmission slot, the radio further comprises a classifier and wherein the prediction module is arranged to use an output from the classifier to determine the likelihood that the re-transmission slot will be required by the radio.

13. The apparatus according to claim 12, further comprising the co-located radio and the signaling link between the radio and the co-located radio.

14. One or more tangible non-transitory processor-readable media with processor-executable instructions for performing a method comprising: setting a priority level of a slot based on a determination of a likelihood that the slot will be required by a first radio; and signaling the priority level to a second radio, wherein the first and second radios are co-located and share a resource, wherein setting a priority level of slot based on a determination of a likelihood that the slot will be required by a first radio comprises: determining a likelihood that the slot will be required by the first radio; and setting a priority level based on the likelihood; wherein the slot comprises a re-transmission slot and wherein determining a likelihood that the slot will be required by the first radio comprises: computing a metric, the metric comprising one of a number of re-transmission slots used in a defined period and a number of failures in a primary transmission slot.

15. A method comprising: setting a priority level of a slot based on a determination of a likelihood that the slot will be required by a first radio; and
    signaling the priority level to a second radio, wherein the first and second radios are co-located and share a resource; wherein the slot comprises a re-transmission slot and wherein the likelihood is determined based on an output from a classifier associated with the first radio, and wherein determining the likelihood that the slot will be required by the first radio includes: computing a metric, the metric comprising one of a number of re-transmission slots used in a defined period and a number of failures in a primary transmission slot.

16. A method comprising: setting a priority level of a slot based on a determination of a likelihood that the slot will be required by a first radio; and signaling the priority level to a second radio, wherein the first and second radios are co-located and share a resource; wherein the slot comprises a re-transmission slot and wherein the likelihood is determined based on an output from a classifier associated with the first radio, wherein setting the priority level comprises: if the output from the classifier indicates that a channel used for a primary transmission slot is poor, setting a high priority level; and if the output from the classifier indicates that a channel used for a primary transmission slot is good, setting a low priority level, wherein the first radio comprises the classifier and a prediction module, and wherein the prediction module is arranged to use the output from the classifier to determine the likelihood that the re-transmission slot will be required by the first radio.

* * * * *